United States Patent
Hofmeister et al.

(10) Patent No.: US 8,039,743 B2
(45) Date of Patent: Oct. 18, 2011

(54) APPARATUS AND METHOD FOR LONGITUDINAL SEALING OF ELECTRICAL LINES

(75) Inventors: Werner Hofmeister, Muehlacker (DE); Ulrich Schmatz, Besigheim (DE); Thomas Frahammer, Aichtal (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 12/300,755

(22) PCT Filed: Jul. 10, 2007

(86) PCT No.: PCT/EP2007/057042
§ 371 (c)(1),
(2), (4) Date: Nov. 13, 2008

(87) PCT Pub. No.: WO2008/028707
PCT Pub. Date: Mar. 13, 2008

(65) Prior Publication Data
US 2009/0183896 A1 Jul. 23, 2009

(30) Foreign Application Priority Data
Sep. 8, 2006 (DE) .......................... 10 2006 042 369

(51) Int. Cl.
*H01B 7/00* (2006.01)
(52) U.S. Cl. ........................................... 174/36; 29/825
(58) Field of Classification Search .................. 174/36, 174/110 R, 113 R, 115; 29/825
See application file for complete search history.

(56) References Cited

U.S. PATENT DOCUMENTS

| 3,775,548 | A | * | 11/1973 | Zinser et al. ................. 174/23 C |
| 3,823,255 | A | * | 7/1974 | La Gase et al. ............. 174/113 R |
| 3,843,568 | A | * | 10/1974 | Woodland et al. ............... 521/54 |
| 4,095,404 | A | * | 6/1978 | Babayan ......................... 57/297 |
| 4,631,229 | A | * | 12/1986 | Martens et al. ............... 428/343 |
| 4,703,132 | A | * | 10/1987 | Marciano-Agostinelli et al. ........................... 174/23 C |
| 5,010,209 | A | * | 4/1991 | Marciano-Agostinelli et al. ........................... 174/23 C |
| 6,184,473 | B1 | * | 2/2001 | Reece et al. .............. 174/110 R |

FOREIGN PATENT DOCUMENTS

| DE | 103 45 676 | 4/2005 |
| GB | 2 270 792 | 3/1994 |

OTHER PUBLICATIONS

International Search Report of Application No. PCT/EP2007/057042, dated Nov. 27, 2007.

* cited by examiner

*Primary Examiner* — William Mayo, III
(74) *Attorney, Agent, or Firm* — Kenyon & Kenyon LLP

(57) ABSTRACT

In a method for longitudinal sealing of electrical conductors that include one or more conductor elements disposed inside an external sheath, and include cavities between the individual conductor elements and between the individual conductor elements and the external sheath, in which the one end, requiring sealing, of the conductor is immersed in a liquid sealing compound, and the other end of the conductor has negative pressure applied to it. A sealing apparatus suitable for carrying out said method encompasses a supply reservoir for the liquid sealing compound into which the one end, requiring sealing, of the conductor is immersed, and a negative-pressure source to which the other end of the conductor is connected.

8 Claims, 1 Drawing Sheet

APPARATUS AND METHOD FOR LONGITUDINAL SEALING OF ELECTRICAL LINES

FIELD OF THE INVENTION

The present invention relates to an apparatus and a method for longitudinal sealing of electrical conductors (lines).

BACKGROUND OF THE INVENTION

An apparatus and a method of this kind have been discussed, for example, in DE 103 45 676 A1.

The penetration of water or other media into vehicle wiring harnesses can result in failure of the connected components and control units, and thus also in failure of the vehicle, since liquid media propagate, especially in stranded conductors, through the cavities. Given corresponding requirements defined by the installation location, plug connectors of sealed design are therefore used so as to obtain a sealed wiring harness. For electrical conductors that do not end in a plug connector, e.g. conductors equipped with ring cable lugs, heat-shrink tubes with hot melt adhesives are often applied from outside for sealing.

In the engine compartment specifically, or even for the installation of electrical components such as injection nozzles in the engine of a motor vehicle, media other than water, such as motor oil, also occur. A hot melt adhesive meeting the requirements resulting therefrom is not available, so that other, expensive solutions must be resorted to here, for example special ring cable lugs having a sealing insert or disconnect plug.

German patent document DE 103 45 676 A1 discusses the introducing of a liquid sealing compound into cavities of an electrical conductor by way of an injection needle. The risk exists, however, that the injection needle will wear or clog over time, and need to be replaced.

SUMMARY OF THE INVENTION

The exemplary embodiments and/or exemplary methods of the present invention makes it possible to seal electrical conductors, in particular stranded conductors and cable harnesses, against the penetration of motor oil as well when using a suitable sealing compound. According to the exemplary embodiments and/or exemplary methods of the present invention, the sealing compound is introduced or drawn into the cavities of the conductor by way of a negative pressure (reduced pressure) applied from the other end of the conductor. Immersion of the intake point into the sealing compound ensures that the sealing compound is drawn into the conductor; this can also be checked by way of the change in pressure over time during the intake process. In addition, the danger of wear or clogging, as in the case with injection needles, does not exist in the context of the method proposed here.

Further advantages and advantageous embodiments of the subject matter of the invention are evident from the description, the drawings, and the claims.

An exemplifying embodiment of the sealing apparatus according to the present invention is depicted in the drawings and further explained in the description that follows. The Figures are in some cases cut away, schematic, and not to scale.

DETAILED DESCRIPTION

Figure 1:
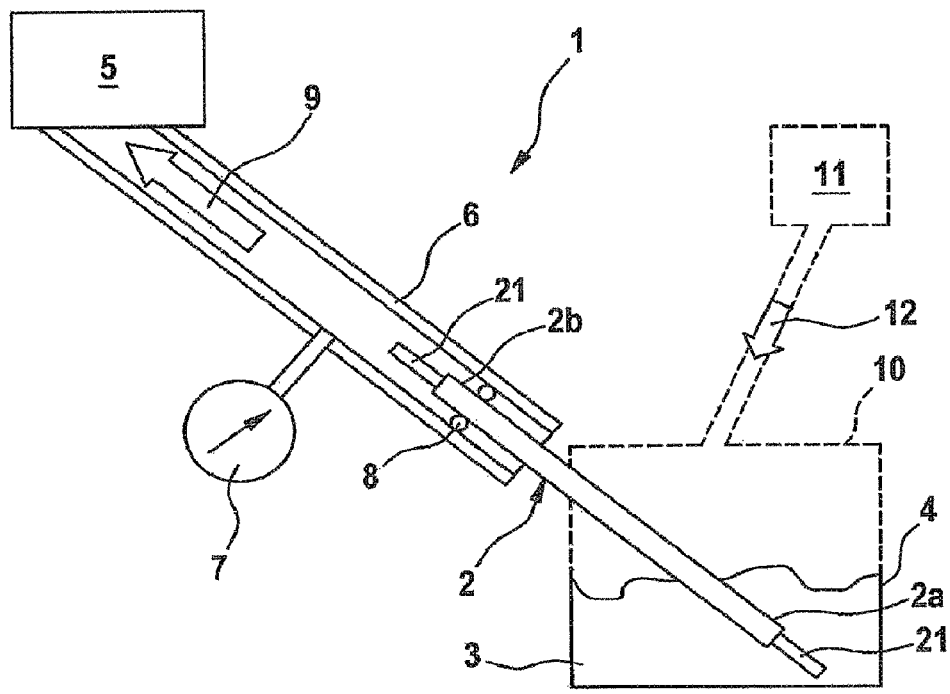
FIG. 1 shows the apparatus according to the present invention for longitudinal sealing of electrical conductors.

Apparatus 1 shown in FIG. 1 serves for longitudinal sealing of an electrical conductor 2 having one or more conductor elements (line fibers) 21. Conductor elements 21 are surrounded, as shown in FIG. 2, by an external sheath 22, such that cavities 23 remain between individual conductor elements 21 and between individual conductor elements 21 and external sheath 22.

Sealing apparatus 1 encompasses a supply reservoir (reservoir vessel) 4 filled with liquid sealing compound 3, and a negative-pressure source (vacuum-pressure source) (vacuum pump) 5 having an adapter connector 6. The pressure present in adapter connector 6 is sensed with a pressure sensor 7 that is connected to a monitoring unit (not shown).

As shown in FIG. 1, the one end 2a, requiring sealing, of conductor 2 is immersed in liquid sealing compound 3. The other end 2b of conductor 2 is connected to adapter connector 6 in a manner sealed by way of a seal 8. Drawn in by the negative pressure (arrow direction 9), sealing compound 3 penetrates into cavities 23 of conductor 2, its penetration depth into conductor 2 being dependent on the processing duration and on the viscosity of sealing compound 3. If applicable, sealing compound 3 is post-treated by way of a subsequent treatment step such as, for example, a temperature treatment, in order to achieve the full sealing effect. Advantageously, multiple conductors 2 can also be simultaneously acted upon by negative pressure via adapter 6 and sealed with sealing compound 3. When end 2a, requiring sealing, of conductor 2, or more precisely external sheath 22, is immersed in sealing compound 3, this ensures that sealing compound 3 is drawn into conductor 2. This operation can also be checked directly by way of the change in pressure, sensed with pressure sensor 7, during the intake process.

Figure 2:
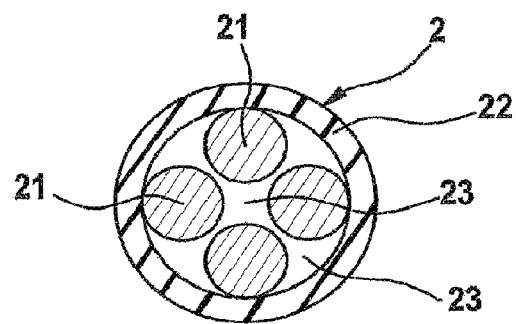
FIG. 2 shows the cross section of an electrical conductor requiring sealing.

Alternatively or in addition to the negative-pressure source, as indicated with dashed lines in FIG. 2, sealing compound supply reservoir 4 can be closed off in pressure-tight fashion with a cover 10 and connected to a positive-pressure source 11. Alternatively or in addition to the action of the negative pressure, the action of the positive pressure (arrow direction 12) thus also results in the introduction of sealing compound 3 into conductor 2 that requires sealing.

What is claimed is:

1. A method for longitudinally sealing electrical conductors, the method comprising:
   immersing one end, which requires sealing, of the conductor in a liquid sealing compound; and
   applying a negative pressure to another end of the conductor;
   wherein the conductors include conductor elements disposed inside an external sheath, and include cavities between the individual conductor elements and between the individual conductor elements and the external sheath.

2. The sealing method of claim 1, wherein the supply reservoir of the liquid sealing compound, into which supply reservoir the one end of the conductor is immersed, has a positive pressure applied to it.

3. The sealing method of claim 1, wherein the sealing compound drawn into the conductor is subsequently subjected to a post-treatment, which is a temperature treatment.

4. The sealing method of claim 1, wherein the negative pressure is monitored as the sealing compound is drawn in.

5. An apparatus for longitudinally sealing electrical conductors, comprising:
a negative-pressure source; and
a supply reservoir for a liquid sealing compound into which one end, requiring sealing, of the conductor is immersed, and by the negative-pressure source to which another end of the conductors is connected.

6. The sealing apparatus of claim 5, wherein the negative-pressure source has an adapter to which the conductors requiring sealing are connectable.

7. The sealing apparatus of claim 5, further comprising:
a positive-pressure source, to which the sealing compound supply reservoir is connectable;
wherein the sealing compound supply reservoir is closed off in pressure-tight fashion.

8. The sealing apparatus of claim 5, further comprising:
a pressure sensor to sense the negative pressure of the negative-pressure source.

* * * * *